United States Patent
Conrad et al.

(10) Patent No.: US 6,965,808 B1
(45) Date of Patent: Nov. 15, 2005

(54) SYSTEM AND METHOD FOR OPTIMIZING METROLOGY SAMPLING IN APC APPLICATIONS

(75) Inventors: Edward W. Conrad, Jeffersonville, VT (US); Craig E. Schneider, Underhill, VT (US); John S. Smyth, Milton, VT (US); Daniel B. Sullivan, Milton, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/709,319

(22) Filed: Apr. 28, 2004

(51) Int. Cl.[7] .............................. G06F 19/00
(52) U.S. Cl. ............ 700/108; 700/109; 700/121
(58) Field of Search ................. 700/95, 100, 103, 700/108, 109, 110, 115, 116, 117, 121; 438/5, 438/7, 8, 9, 14

(56) References Cited

U.S. PATENT DOCUMENTS

| | | | |
|---|---|---|---|
| 6,442,445 B1 | 8/2002 | Bunkofske et al. | |
| 6,442,496 B1 * | 8/2002 | Pasadyn et al. | 438/7 |
| 6,519,357 B2 | 2/2003 | Takeuchi | |
| 6,650,955 B1 | 11/2003 | Sonderman et al. | |
| 6,678,668 B2 | 1/2004 | Fisher et al. | |
| 6,684,124 B2 | 1/2004 | Schedel et al. | |
| 6,821,792 B1 * | 11/2004 | Sonderman et al. | 438/14 |
| 2002/0193899 A1 * | 12/2002 | Shanmugasundram et al. | 700/121 |
| 2003/0171829 A1 | 9/2003 | Fisher et al. | |
| 2003/0204278 A1 | 10/2003 | Grasshoff et al. | |

* cited by examiner

*Primary Examiner*—Leo Picard
*Assistant Examiner*—Charles Kasenge
(74) *Attorney, Agent, or Firm*—Anthony J. Canale; Hoffman, Warnick & D'Alessandro LLC

(57) ABSTRACT

A system and method for optimizing metrology sampling rates in an advanced process control (APC) application. A method is provided for processing a run of workpieces, the method comprising the steps of: providing a database comprising subgroups of data representing characteristics from previously processed workpieces; selecting a first subgroup of data having characteristics that satisfy a predetermined criteria; determining processing conditions for a processing tool corresponding to said first subgroup of data; processing the run of workpieces with the process tool using the determined processing conditions; and measuring the run of workpieces according to a sampling rate determined from the first subgroup of data.

23 Claims, 2 Drawing Sheets

Identify the best available subgroup of data from a historical database that satisfies predetermined criteria for a current processing operation. S1

Determining processing conditions for a process tool based on the identified subgroup of data. S2

Processing a run of workpieces on the process tool using the determined processing conditions. S3

Measuring the run of workpieces according to a sampling rate determined from the identified subgroup of data. S4

FIG. 2

SYSTEM AND METHOD FOR OPTIMIZING METROLOGY SAMPLING IN APC APPLICATIONS

BACKGROUND OF INVENTION

1. Technical Field

The present invention relates generally to Advanced Process Control (APC) applications, and more specifically relates to a system and method for optimizing metrology sampling in an APC application.

2. Related Art

As the ground rule requirements of semiconductor products tighten, the use of Advanced Process Control (APC) applications has increased in an effort to meet the improved process control needed to achieve these new ground rules. Many APC applications (e.g., critical dimension, overlay, etc.) utilize post process metrology data with actual process conditions to provide feedback for new optimized process conditions (e.g., dose, overlay corrections, etc.).

In many cases the feedback systems utilize rules that scan historical metrology data looking for the best available data to use for parameter optimization. Typically, these "rules based" systems will scan the historical data multiple times, modifying the inclusion criteria for each pass, until an acceptable data set is met. For instance, the first rule may look for data resulting from lots processed with a particular reticle, while a second rule may look for data resulting from lots of a certain technology, etc.

The data set obtained from the first pass generally results in the highest confidence feedback calculations. Calculations based on data sets obtained from additional searches typically result in decreasing confidence, since the lower confidence data sets typically are forced to include data from a broader array of products or tools in order to obtain an adequate data set.

Post process metrology data is collected on a sample of the products run through the process step utilizing the APC system. The size of the sample is based on the process capability (Cpk) of the product or selected types of products run through the process step. In current APC applications, a single Cpk value is calculated for a process that in practice runs product from high and low confidence calculations. For instance, a first lot of wafers may be processed according to a first APC process rule, while a second lot of wafers may be processed at a different time according to a second APC process rule. Both lots, however, will be sampled for a metrology step according to a single Cpk value.

In general, the higher the Cpk value, the smaller the sampling requirement. Given the costs involved with collecting metrology data, significant savings can be incurred with increased metrology skipping. Accordingly, a need exists for optimizing the metrology sampling process in APC applications.

SUMMARY OF INVENTION

The present invention addresses the above-mentioned problems, as well as others, by providing a system and method for optimizing metrology sampling for a "product lot" by examining the APC process rule used for processing the product lot. In a first aspect, the invention provides a method of processing a run of workpieces, the method comprising the steps of: providing a database comprising subgroups of data representing characteristics from previously processed workpieces; selecting a first subgroup of data having characteristics that satisfy a predetermined criteria; determining processing conditions for a processing tool corresponding to the first subgroup of data; processing the run of workpieces with the process tool using the determined processing conditions; and measuring the run of workpieces according to a sampling rate determined from the first subgroup of data.

In a second aspect, the invention provides an advanced process control (APC) system, comprising: a data analysis system that determines a set of conditions for a manufacturing process based on a subgroup of data identified from a historical database, wherein the subgroup of data is identified according to a selected rule; a tagging system that associates a tag containing the selected rule to each product lot subjected to the manufacturing process; and a sampling optimization system that examines the tag for each product lot processed, and determines a metrology sampling rate based on the selected rule.

In a third aspect, the invention provides a method for optimizing metrology sampling rates in an advanced process control (APC) application, comprising: calculating capability ratios (Cpk's) for a product processed by each of a plurality of rules within a single APC process, wherein each Cpk calculation is based on an associated rule; calculating sampling rates for each calculated Cpk; processing a run of the product using a selected rule; tagging the run of the product after processing with the selected rule; and determining a metrology sampling rate for the run based on the selected rule.

In a fourth aspect, the invention provides a program product stored on a recordable medium for optimizing an advanced process control (APC) system, comprising: means for determining a set of conditions for a manufacturing process based on a subgroup of data identified from a historical database, wherein the subgroup of data is identified according to a selected rule; means for associating the determined set of conditions to a product lot subjected to the manufacturing process; and means for examining the associated determined set of conditions for the product lot to determine a metrology sampling rate.

BRIEF DESCRIPTION OF DRAWINGS

These and other features of this invention will be more readily understood from the following detailed description of the various aspects of the invention taken in conjunction with the accompanying drawings in which:

FIG. 2 depicts a flow chart of a method of determining sampling rates for measuring processed workpieces in accordance with the present invention.

DETAILED DESCRIPTION

Figure 1:
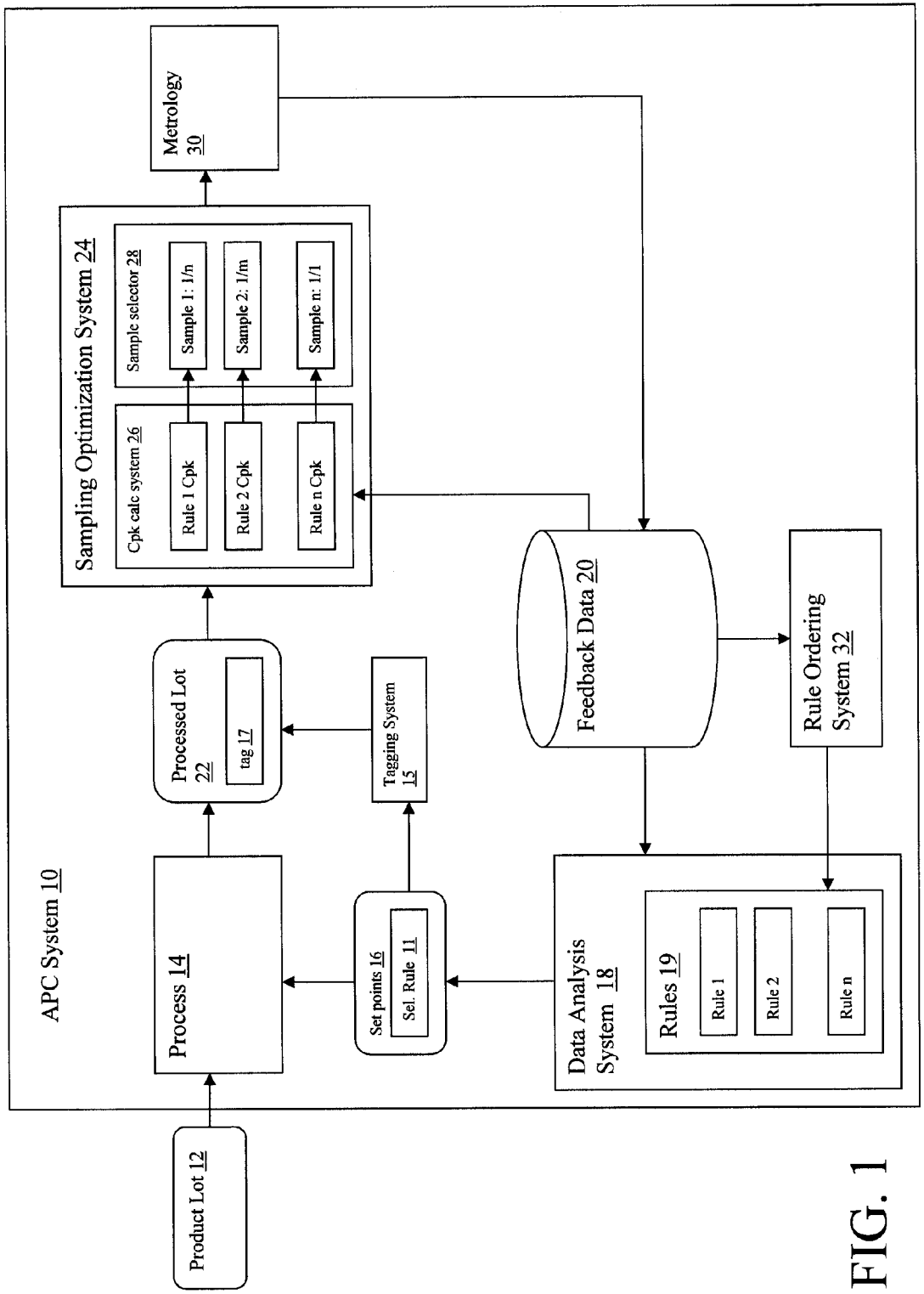
FIG. 1 depicts an advanced process control (APC) system in accordance with the present invention.

Referring now to the drawings, FIG. 1 depicts an APC system 10 that includes features for selecting an optimized metrology sampling rate. APC system 10 includes a process 14 that processes a "product lot" 12 into a "processed lot" 22. For the purposes of this description, the terms "product lot," "product run," "run of workpieces," etc., are used interchangeably to describe a set of workpieces subjected to a manufacturing process. Process 14 may include any manufacturing process that operates on one or more workpieces contained in product lot 12. Common processing examples include, but are not limited to, semiconductor processing stepper operations, such as those used in lithography. Process 14 is implemented using "set points" 16 that were determined based on a selected rule 11 determined by data analysis system 18. Set points 16 may be defined as any operational settings or conditions utilized by process 14. For example, set points 16 may include dosage settings in a semiconductor processing step. Set points 16 are determined based on feedback data 20 that was obtained from previous processing operations in any manner known in the art.

Data analysis system 18 includes a plurality of rules 19 (e.g., rule 1, rule 2, ... rule n) that can be applied to feedback data 20 to "filter" the data. Each of the rules 19 provides search criteria for examining historical feedback data 20. Typically, the rules are ordered from best to worst such that first rule provides the highest level of confidence; the second rule provides the second highest level of confidence, etc. For instance, rule 1 may search for previous processing results in which the same mask was used as in the current process 14, rule 2 may search for previous processing results in which the same level and technology was used, and rule n may search for any previous processing results that operated on the same level. Data analysis system 18 selects the best rule that returns an adequate number of results (or samples). Based on the selected rule 11, set points 16 are determined for process 14.

After product lot 12 is processed with the determined set points 16, the processed lot is "tagged" by tagging system 15 with a tag 17 that dictates which rule 11 was used to process the lot. As is typical in most APC applications, a measuring or metrology step 30 is implemented on a sampling of the processed lot 22 for, among other reasons, quality control. As noted above, smaller sample rates are desired to reduce costs, and sample rates are inversely proportional to the confidence level of the rule used, i.e., the higher the confidence level, the smaller the sample. After samplings of the processed lot 22 are subjected to the metrology step 30, the results are fed back and stored as feedback data 20 for later use.

In order to achieve smaller samples, sampling optimization system 24 includes a Cpk calculation system 26 that predetermines a Cpk value, i.e., process capability ratio, for each processed lot 22 based on information contained in tag 17. In an exemplary embodiment, the Cpk value is determined based on the selected rule 11, which is stored in tag 17. However, it should be understood that tag 17 could include any information that reflects the subgroup of data identified from feedback data to provide set points 16. Moreover, tag 17 could simply include a Cpk value or sampling rate determined based on the subgroup of data, e.g., a process tool, a process, a technology, a part number, level, mask, operation, etc. Furthermore, it should be understood that tag 17 could be implemented in any manner, e.g., with a physical label, using a tracking system, using a database of identifiers associated with each processed lot, etc.

Cpk values can be calculated in any manner so long as they are based on the identified subgroup of data (i.e., the selected rule or processing conditions). Formulas for calculating Cpk are well known in the art, and are therefore not described here in detail. Cpk values can be predetermined and stored in a look-up table, or calculated dynamically. Based on the determined Cpk value, a sampling rate for the processed lot 22 is determined by sample selector 28. For instance, as shown, if rule 1 was used to determine set points 16 for process 14, a rule 1 Cpk value would be used, which would dictate a sampling rate of 1/n; if rule 2 was used, a rule 2 Cpk value would be used, which would dictate a sampling rate of 1/m, etc. Thus, in the case where multiple lots of similar products are processed at different times, each processed lot 22 can be sampled at a rate commensurate with the rule used for processing. Therefore, in accordance with this invention, multiple lots may have different sample rates based upon the APC rule.

In addition, APC system 10 may include a rule ordering system 32. As noted above, data analysis system includes a set of rules 19 that are ordered from best to worst. Often, however, the ordering is not always accurate, e.g., rule 5 may provide a better performance than rule 4, etc. To address this, rule ordering system 19 provides an automated mechanism for ordering the rules from best to worst. In one embodiment, rule ordering system analyzes historic Cpk values of lots processed from each rule to order rule selections from highest to lowest capability. For instance, if the historic Cpk values for rule 5 were higher than the historic Cpk values of rule 4, rule ordering system 19 would switch the order. In a second embodiment, process capabilities for each rule could be evaluated in real-time rule using metrology data and modeled data to reorder the rules.

FIG. 2 depicts a flow diagram of a generalized method of implementing the present invention. In the first step S1, the best available subgroup of data is identified from a historical database that satisfies predetermined criteria for a current processing operation. In the example provided above, this process is achieved with a rules based system that identifies the highest confidence rule for which there is an adequate sampling of historical data. However, it should be understood that any methodology for identifying an appropriate subgroup of data from a historical database could be used. At the next step S2, processing conditions for a process tool are determined based on the identified subgroup of data. As noted above, processing conditions may include set points, tool set up, technology, parts, etc. At step S3, a run of workpieces is processed on the process tool using the determined processing conditions. Finally, at step S4, the run of workpieces are measured according to a sampling rate determined from the identified subgroup of data. Namely, parameters from the subgroup of data, e.g., conditions and set points, can be used to calculate a sampling rate.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method of processing a run of workpieces, the method comprising the steps of:
   providing a database comprising subgroups of data representing characteristics from previously processed workpieces;
   selecting a first subgroup of data having characteristics that satisfy a predetermined criteria, wherein the selecting step includes:
      applying a set of rules to the database such that each rule generates a unique subgroup of data, wherein the rules are ordered according to a confidence level, and
      determining a subgroup of data of at least a minimum size that yields a highest confidence level among all of the rules;
   determining processing conditions for a processing tool corresponding to the first subgroup of data;
   processing the run of workpieces with the process tool using the determined processing conditions; and
   measuring the run of workpieces according to a sampling rate determined from the first subgroup of data.

2. The method of claim 1, wherein the characteristics include characteristics of the workpiece.

3. The method of claim 1, wherein the characteristics include characteristics of the process tool.

4. The method of claim 1, wherein the sampling rate is determined from a capability ratio calculated based on the rule used to generate the first subgroup of data.

5. The method of claim 4, wherein, after processing, the run of workpieces is tagged with the rule used to generate the first subgroup of data.

6. The method of claim 1, wherein the run of workpieces comprises a lot of semiconductor parts and the measuring step comprises a metrology process.

7. An advanced process control (APC) system, comprising:
   a data analysis system that determines a set of conditions to be applied to a manufacturing process based on a subgroup of data identified from a historical database, wherein the subgroup of data is identified according to a selected rule, wherein the selected rule generates the subgroup of data of at least a minimum size that provides a highest possible confidence level for each of a set of rules;
   a tagging system that associates a tag containing the selected rule to each product lot subjected to the manufacturing process; and
   a sampling optimization system that examines the tag for each product lot processed and determines a metrology sampling rate based on the selected rule.

8. The APC system of claim 7, further comprising a rule ordering system that orders the set of rules based on historic capability data for product lots processed with each rule.

9. The APC system of claim 7, further comprising a rule ordering system that orders the set of rules in real time by evaluating capability data for each rule using metrology data.

10. The APC system of claim 7, wherein the sampling rate is determined from a capability ratio Cpk calculated based on the selected rule.

11. The APC system of claim 10, wherein the Cpk is further calculated based on factors selected from the group consisting of: a process tool, a process, technology, part number, level, mask and operation.

12. A method for optimizing metrology sampling rates in an advanced process control (APC) application, comprising:
   calculating capability ratios (Cpk) for a product processed by each of a plurality of rules within a single APC process, wherein each Cpk calculation is based on an associated rule;
   calculating sampling rates for each calculated Cpk;
   processing a run of the product using a selected rule;
   tagging the run of the product after processing with the selected rule; and
   determining a metrology sampling rate for the run based on the selected rule.

13. The method of claim 12, comprising the further steps of:
   processing a second run of the product using a second selected rule;
   tagging the second run of the product after processing with the second selected rule; and
   determining a metrology sampling rate for the second run based on the second selected rule.

14. The method of claim 12, wherein the selected rule is selected from a set of ordered rules that identify subgroups of data from a historical database.

15. The method of claim 14, wherein the selected rule generates a subgroup of at least a minimum size that yields a highest possible confidence level.

16. The method of claim 14, comprising the further step of reordering the set of rules based on historic capability data for product processed with each rule.

17. The method of claim 14, comprising the further step of reordering the set of rules in real time by evaluating capability data for each rule using metrology data.

18. The method of claim 12, wherein the Cpk is further calculated based on factors selected from the group consisting of: a process tool, a process, technology, part number, level, mask and operation.

19. A program product stored on a recordable medium for optimizing an advanced process control (APC) system, comprising:
   means for determining a set of conditions to be applied to a manufacturing process based on a subgroup of data identified from a historical database, wherein the subgroup of data is identified according to a selected rule, wherein the selected rule generates the subgroup of data of at least a minimum size that yields a highest possible confidence level for each of a set of rules;
   means for associating the determined set of conditions to a product lot subjected to the manufacturing process; and
   means for examining the associated determined set of conditions for the product lot to determine a metrology sampling rate.

20. The program product of claim 19, wherein the associating means includes tagging the selected rule to the product lot.

21. The program product of claim 19, further comprising means for ordering the set of rules based on historic capability data for product lots processed with each rule.

22. The program product of claim 19, further comprising means for ordering the set of rules in real time by evaluating capability data for each rule using metrology data.

23. The program product of claim 19, wherein the sampling rate is determined from a capability ratio Cpk calculated based on the selected rule.

* * * * *